United States Patent [19]

Best et al.

[11] Patent Number: 4,869,474

[45] Date of Patent: Sep. 26, 1989

[54] VEHICLE ENGINE SUSPENSION SYSTEMS

[75] Inventors: Anthony Best, Westbury; David M. Bethell, Bradford on Avon; Raymond Hoole, Trowbridge, all of England

[73] Assignee: BTR plc, London, England

[21] Appl. No.: 189,369

[22] Filed: May 2, 1988

[30] Foreign Application Priority Data

May 8, 1987 [GB] United Kingdom ............... 8710998

[51] Int. Cl.⁴ ............................. F16F 7/10; F16M 7/00; F16M 13/00
[52] U.S. Cl. ..................................... 267/136; 248/550; 248/562; 248/636; 267/140.1; 267/219; 180/300; 180/902; 188/379
[58] Field of Search .................... 267/140.1, 136, 219, 267/220; 180/902, 312, 300; 188/378-380, 300, 267, 299; 248/550, 562, 636; 123/192 R; 280/707

[56] References Cited

U.S. PATENT DOCUMENTS

| 3,606,233 | 9/1971 | Scharton et al. | |
|---|---|---|---|
| 3,957,128 | 5/1976 | LeSalver et al. | 180/291 |
| 4,033,541 | 7/1977 | Malueg | 248/550 |
| 4,531,484 | 7/1985 | Kimura et al. | 248/550 X |
| 4,546,960 | 10/1985 | Abrams et al. | 267/136 |
| 4,610,420 | 9/1986 | Fukushima et al. | 248/550 |
| 4,615,504 | 10/1986 | Sandercock | 248/550 |
| 4,624,435 | 11/1986 | Freudenberg | 248/550 |
| 4,635,892 | 1/1987 | Baker | 248/550 |
| 4,638,983 | 1/1987 | Idigkeit et al. | 248/550 X |
| 4,641,817 | 2/1987 | Clark et al. | 248/562 X |
| 4,643,385 | 2/1987 | Sandercock | 248/550 |
| 4,648,576 | 3/1987 | Matsui | 267/140.1 X |
| 4,650,170 | 3/1987 | Fukushima | 267/140.1 |
| 4,664,219 | 5/1987 | Hoerig et al. | 267/140.1 X |
| 4,669,711 | 6/1987 | Beer | 267/140.1 |
| 4,687,171 | 8/1987 | Freudenberg | 248/550 |
| 4,699,348 | 10/1987 | Freudenberg | 248/550 |
| 4,700,933 | 10/1987 | Chikamori et al. | 248/550 X |
| 4,720,084 | 1/1988 | Hollerweger et al. | 267/140.1 X |
| 4,735,296 | 4/1988 | Pinson | 248/550 X |
| 4,742,998 | 5/1988 | Schubert | 267/140.1 X |
| 4,757,981 | 7/1988 | Härtel | 188/267 X |
| 4,762,306 | 8/1988 | Watanabe et al. | 248/550 X |
| 4,788,949 | 12/1988 | Best et al. | 180/300 X |
| 4,793,599 | 12/1988 | Ishioka | 248/550 X |
| 4,802,648 | 2/1989 | Decker et al. | 248/550 |
| 4,813,513 | 3/1989 | LeSalver et al. | 248/636 X |

FOREIGN PATENT DOCUMENTS

| 0081085 | 4/1986 | European Pat. Off. . |
| 0083803 | 6/1986 | European Pat. Off. . |
| 2947018 | 5/1981 | Fed. Rep. of Germany . |
| M486 | 6/1986 | Japan . |
| M569 | 3/1987 | Japan . |
| 1020851 | 2/1966 | United Kingdom . |
| 2119897 | 11/1983 | United Kingdom . |
| 2164416 | 3/1986 | United Kingdom . |
| 2165804 | 4/1986 | United Kingdom . |
| 8500208 | 1/1985 | World Int. Prop. O. . |

Primary Examiner—Douglas C. Butler
Attorney, Agent, or Firm—Lorusso & Loud

[57] ABSTRACT

A vehicle engine suspension system in which, in order to reduce 'shake' electrically actuated engine mounts are provided, power being supplied to the engine mounts by a control system responsive to vehicle body accelerations (e.g. in the vertical direction). The arrangement is such that when a tendency of the body to move is detected, e.g. by an accelerometer mounted on the body, the engine mounts are actuated so as to generate, between the engine and the body, forces which are of such amplitude and phase as to reduce the shake of the body.

23 Claims, 5 Drawing Sheets

VEHICLE ENGINE SUSPENSION SYSTEMS

This invention relates to vehicle engine suspension systems, particularly but not exclusively for motor cars. It may also have wider application, for example to any kind of land vehicle or to water-borne vessels, and the term "vehicle" is intended to extend to any mechanically propelled transport means.

A motor car engine is normally mounted in the car body on resilient engine mounts to serve to reduce the transmission of engine noise to the body.

The design of engine mounts normally calls for a compromise to be made in respect of their performance with the aim of reducing:

(1) Noise and
(2) Shake.

The term 'noise' in the context of this application refers to engine-produced vibrations, typically lying in a frequency range of 30 Hertz to 400 Hertz.

The term 'shake' in the context of this application refers to the effect on the vehicle body of the coupling of low-frequency vibrations of the body, engine, and suspension, typically in the range 8 Hertz to 16 Hertz, caused for example by vibration inputs from the road via the vehicle suspension. The 'shake' vibrations of the vehicle body are felt by and objectionable to the occupants of the vehicle.

A problem in the design of vehicle engine suspension systems is that for the reduction of engine noise transmission to the body it is desirable to provide engine mounts having low stiffness and low damping: unfortunately the use of such mounts tends to result in high levels of shake.

The use of rubber in engine mounts is well-known, and to improve the shake control performance of the rubber mounts it is also known to provide damping, e.g. by hydraulic means. It has also been proposed, for example in UK Patent No. 1473750 and UK Patent Application No. 2165804.A to couple engine mounts by hydraulic or pneumatic means to vehicle body suspension systems.

According to the invention, a vehicle engine suspension system comprises engine suspension means arranged to be mounted in operative relation to a body and an engine of a vehicle and power actuation means for said engine suspension means arranged to be actuated by energy from a source external to the said engine suspension and power actuation means, detector means for sensing movements of the body or forces applied thereto, and control means for the power actuation means, said control means being responsive to the detector means to govern the supply of energy from said source to the power actuation means whereby movement of the body or a tendency of the body to move causes operation of the power actuation means so as to tend to move the engine and thereby create a reaction force via the engine suspension means on the body tending to reduce the said movement or tendency to move of the body.

The invention also provides a vehicle comprising an engine supported by a vehicle engine suspension system as defined in the preceding paragraph.

Normally the detector means is positioned to detect vertical movement or acceleration of the body in a generally vertical direction (the term 'vertical' in this context meaning that directon in the vehicle body which is normal to a surface on which the vehicle stands) and the system is arranged to generate opposing reaction forces on the body. Alternatively, the system could be used to detect and oppose movement or tendency to move of the body in another direction, e.g. a horizontal direction.

The detector means may alternatively be positioned to detect forces imposed on the vehicle suspension, and thereby to detect a tendency of the body to move.

The invention interposes an active power actuated suspension means between the engine and the vehicle body. The power actuation is preferably electrical or electrically controlled and its effect is to use the mass of the engine to generate opposing reaction forces which tend to nullify the body's tendency to shake at low frequencies in response to road shocks.

In a conventional engine mounting system resistance to shake can be increased by increasing the stiffness or damping of the system, ultimately providing the greatest resistance to shake when the engine is rigidly fixed to the body (but with the penalty of increased noise transmission). The system in accordance with the invention can, within limits imposed by the permissible amplitude of the resulting engine vibrations, provide even higher resistance to the shake vibrations of the vehicle body than is provided by a rigidly mounted engine since the phase and amplitude of the forces generated by the actuation means can cause greater acceleration of the engine and consequently greater reaction forces on the body than would be experienced with a rigidly mounted engine.

Conveniently, the energy source for operation of the system in accordance with the invention is the vehicle's electrical system, and the power actuation means comprises an electromagnetic actuator mounted in or associated with a fluid pressure suspension device constituting an engine mount. Alternatively, the energy source may be, for example, an engine-driven source of hydraulic or pneumatic power, or engine-derived vacuum.

A number of embodiments of the invention will now be described, by way of example, with reference to the accompanying drawings, in which.

Figure 1:
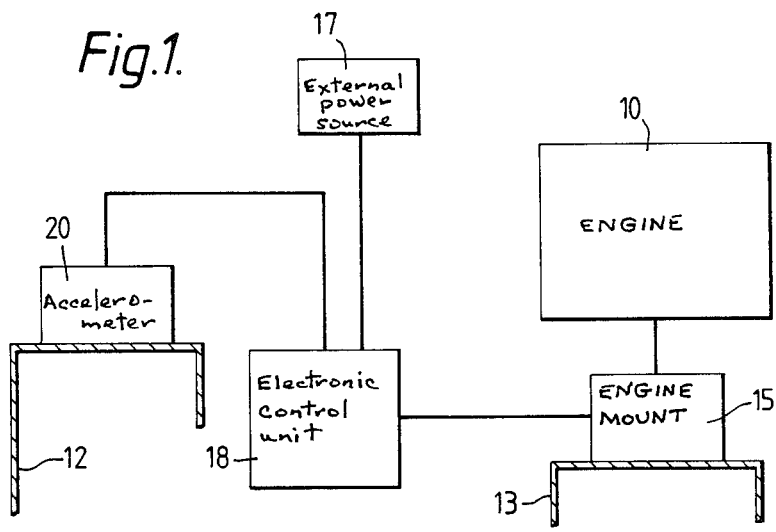
FIG. 1 is a block schematic diagram illustrating a system in accordance with the invention.

The system illustrated in FIG. 1 is arranged to support an engine 10 in a motor car, portions of the body of the car being indicated at 12 and 13. The portion 12 may for example be a front wing of the car supported on a conventional Macpherson strut suspension for the associated road wheel. The engine 10 is mounted on a body component 13 by means of a number of resilient engine mounts, one of which is indicated at 15. The engine mount 15 comprises power actuation means which is arranged to be actuated by electrical energy from an external power source 17, which may conveniently be the vehicle's electrical system, supplied via control means in the form of an electronic control unit 18.

The control unit 18 responds to signals from an accelerometer 20 which is attached to the vehicle body in a position to detect vertical accelerations of the body and transmit analogue signals to the electronic control unit 18 corresponding to the instantaneous magnitude of such vertical accelerations. The unit 18 is arranged to control the supply of electrical power to actuation means contained in or in association with the engine mount 15 in response to the signals received from the accelerometer 20, and contains electronic means for generating appropriate outputs in order to achieve the purpose of creating between the engine and the body forces which are of such an amplitude and phase as to reduce the shake of the body.

The dynamic behaviour (in the vertical direction only) of the components of the body and engine suspension systems is illustrated by reference to FIG. 2 in which the symbols employed are as follows:

| | | |
|---|---|---|
| Me | - | effective engine mass |
| Mp | - | actuator dynamic mass |
| Mb | - | effective body mass |
| Msf | - | effective mass of damper rod |
| Mh | - | wheel and hub unsprung mass |
| Kp | - | engine to actuator coupling stiffness |
| Ke | - | engine to body suspension stiffness |
| Kb | - | body to damper mount stiffness |
| Ks | - | main ride spring stiffness |
| Kt | - | effective tire stiffness |
| Cb | - | body to damper mount equivalent damping |
| Cs | - | main ride damping |
| Fa | - | actuator force (bi-directional) |
| B | - | transducer mechanism to sense body acceleration (accelerometer) |
| f(V₁) | - | transducer conditioning |
| f(V₂) | - | signal shaping network (filter) |
| A | - | power amplification for actuator |
| V₁ | - | transducer outlet signal |
| V₂ | - | calibrated acceleration signal |

Figure 2:
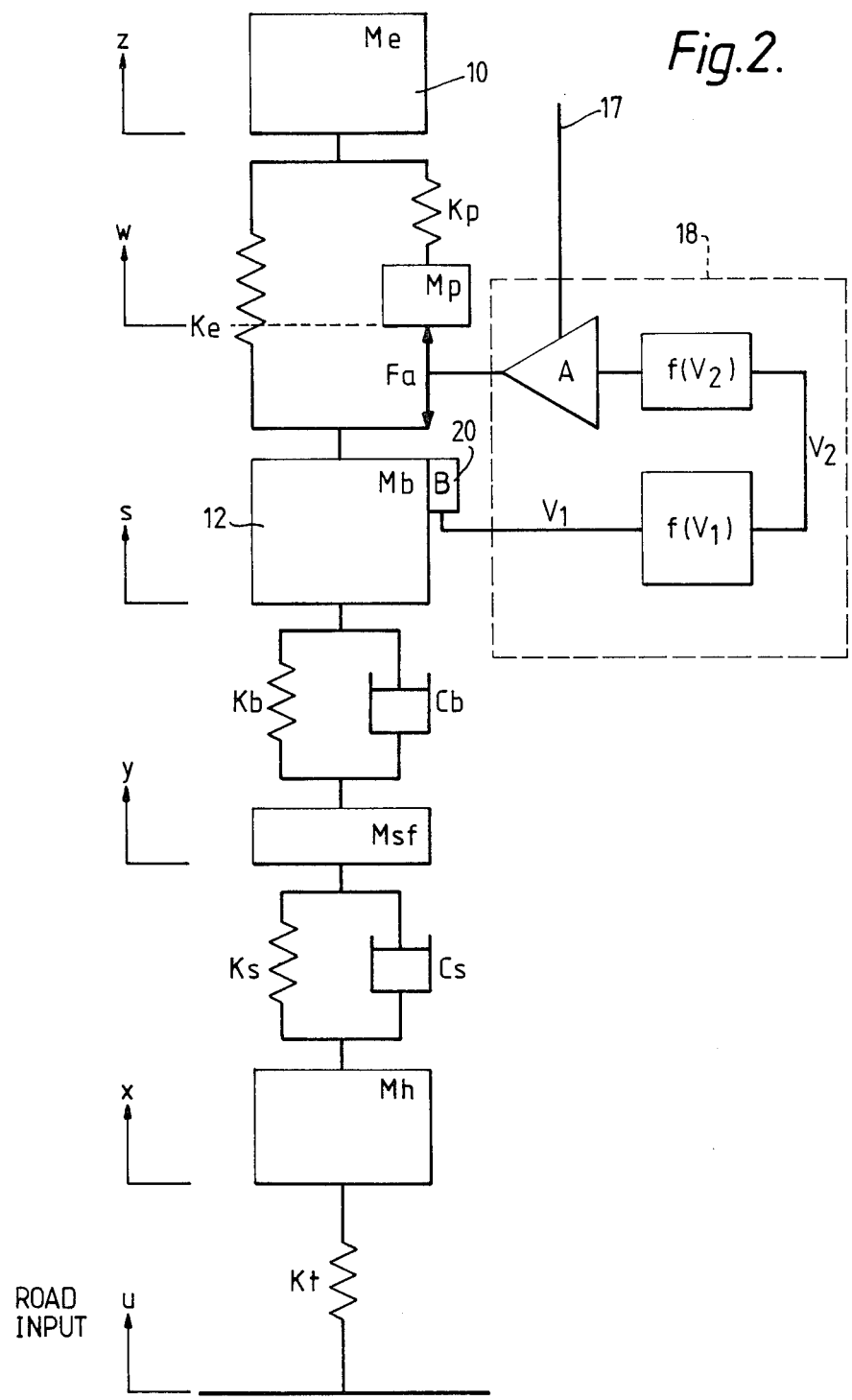
FIG. 2 is a diagram illustrating the dynamic relationship of the components involved in the suspension at one corner of a four-wheeled vehicle and an associated engine mounting system.

The relationships between the components indicated in FIG. 2 are given by the following differential equations for movement of the masses involved, where vertical displacements of the road surface and masses Mh, Msf, Mb, Mp and Me are represented, respectively, by u, x, y, s, w, z:

1. Road Input
$u = Vm.\sin\omega t/\omega$
where $u$ = instantaneous displacement
$Vm$ = constant peak road velocity input
$\omega$ = frequency of disturbance
$t$ = time 2. Wheel + hub unsprung mass
$Mh.\ddot{x} + Cs.\dot{x} + (Kt+Ks).x = Kt. u + Cs.\dot{y} + Ks.y$ 3. Damper rod and associated mass
$Msf.\ddot{y} + (Cs+Cb)\dot{y} + (Ks+Kb).y = Cs.\dot{x} + Ks.x + Cb.\dot{s} + Kb.s$ 4. Vehicle Body
$Mb.\ddot{s} + Cb.\dot{s} + (Kb+Ke)s = Cb.\dot{y} + Kb.y + Ke.z - Fa$ 5. Actuator Piston
$Mp.\ddot{w} + Kp.w = Kp.z + Fa$ 6. Enginne
$Me.\ddot{z} + (Ke+Kp).z = Kp.w + Ke.s$ 7. Actuator Force
$Fa = F''.\ddot{s}$ $$Fa = F'' \cdot s \left( \frac{D^2}{D^2 \times 2\xi\omega_c D + \omega_c^2} \right)$$

where F" is a constant relating actuator force to body acceleration at frequencies above $\omega_o$, D is the "D" operator, 3 is the effective selectivity of the filter, $\omega_o$ is the break point frequency of the filter.

Figure 3:
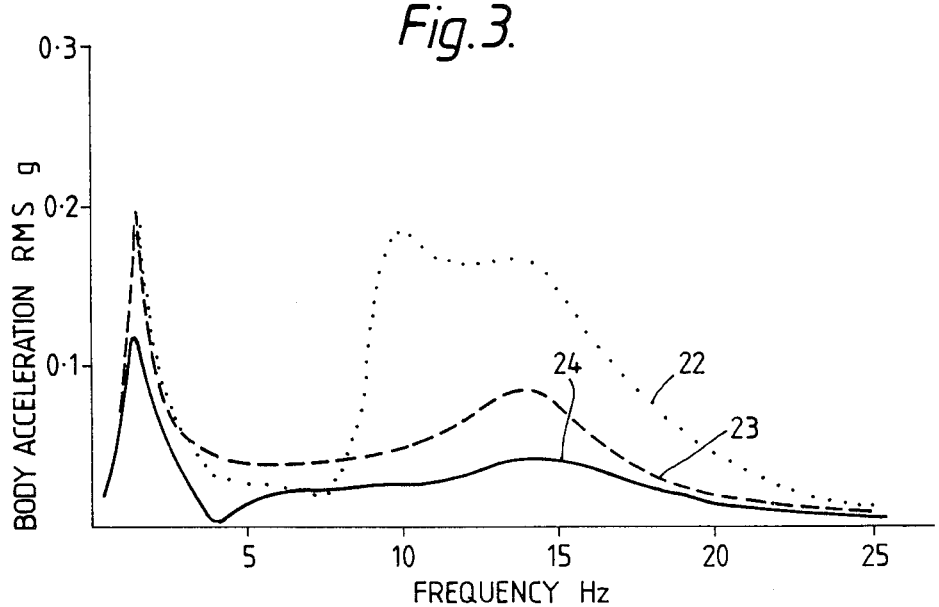
FIG. 3 is a graph showing typical characteristics of the vehicle body accelerations in the vertical direction at different frequencies using various systems of engine suspension.

In FIG. 3, the predicted vertical body accelerations at various input frequencies is plotted for a standard vehicle (curve 22), a vehicle in which the engine is mounted rigidly in the body (curve 23) and a vehicle in which the engine is suspended by a system in accordance with the invention (curve 24). The amplitude of the inputs for which the graphs have been compiled has been assumed to be greater at lower frequencies than at higher frequencies so as to represent as closely as possible the effect on a vehicle travelling on an actual road surface. It will be noted that a considerable reduction in vertical acceleration in the "shake" frequency range (8–16 Hertz) is achievable by means of the system in accordance with the invention, even to a level below that which would be obtainable if the engine was rigidly mounted; this effect is produced without corresponding disadvantages of noise transmission.

The characteristics indicated by the curve 24 assume that the damping of the main body suspension is increased relative to that of a standard vehicle suspension, which is made possible by the improved high frequency isolation characteristics of the system in accordance with the invention.

The electronic control unit 18 contains a high pass second order filter which removes the lower frequencies of the input signal from the accelerometer in the approximate range 0–4 Hertz, a phase inverter and an amplifier to produce sufficient current to drive the power actuator means of the engine mount 15.

Examples of practical engine mount power actuation devices in accordance with the invention are as described below. In each case the engine mounts provide the functions of engine weight support, axial dynamic compliance and radial compliance in isolation from the actuator and also provide actuator force application.

Figure 4:
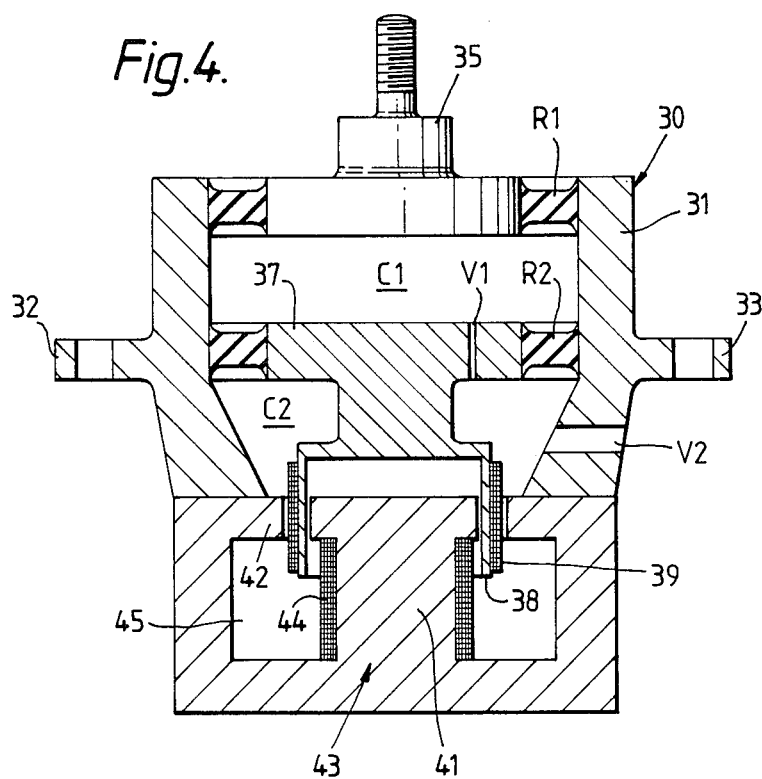
FIG. 4 is a cross-sectional view, taken in a cross-section containing the axis, of an engine mount for use in a system in accordance with the invention.

As shown in FIG. 4 a combined engine mount and power actuation means 30 comprises an outer casing 31 having lugs 32 and 33 to enable it to be secured to a structural member of the vehicle body. An engine attachment member 35 is suspended within the casing 31 by means of a first annular resilient flexible rubber member R1 so as to enclose a first chamber C1 which is closed at its lower end by an actuator member 37 which is mounted within the casing 31 by means of a secod resilient flexible annular rubber member R2. The members R1 and R2 are bonded in known manner to the casing and to their respective members 35 and 37 so as to seal the chamber C1, apart from a vent V1 which is provided through the member 37 into a second chamber C2 which is formed below the member 37.

The body of the member 37 is extended as a hollow cylinder 38 which forms a support for electrical actuation means in the form of a coil 39 coaxial with the member 37 which is thus suspended for axial (vertical) movement between a central cylindrical pole piece 41 and an outer annular pole piece 42 of an electro-magnet 43 incorporating an energising coil 44 around the central pole piece 41. Alternatively, the pole pieces may be of permanently magnetic material. An interior cavity 45 of the electro-magnet communicates with and effectively forms part of the volume of chamber C2 which is sealed, but which may for some purposes be provided with a vent V2.

EXAMPLE 1

In this Example, the weight of the engine is primarily supported by pressurised gas in chambers C1 and C2, vent V2 being omitted. The resilient members R1 and R2 are thin and act as diaphragms to centralise the members 35 and 37 in the radial sense and R1 acts to retain the gaseous pressure in chambers C1 and C2.

The axial dynamic resilience of the device of Example 1 is mainly due to the resilience of pressurised gas in chambers C1 and C2 acting in series, vent V1 being too small to equalise dynamic differences in pressure between the chambers. Radial dynamic resilience is provided mainly by the resilient member R1.

Accelerations of the vehicle body are detected by the accelerometer 20 (see FIG. 1) and via the electronic control unit 18 a corresponding electrical actuation current is fed to the coil 39. The arrangement is such that the coil 39 generates a thrust on the member 37 which is substantially in phase with the corresponding vehicle body acceleration and therefore transmits a corresponding thrust via the pressure in the chamber C1 and member 35 to the engine: the reaction corresponding to this thrust is imposed via the mounting lugs 32 and 33 to the vehicle body in a direction so as to oppose the body acceleration as detected by the accelerometer.

EXAMPLE 2

As a variant to Example 1, the vent V1 may be closed and a different gas pressure established in chamber C2 from that in chamber C1.

EXAMPLE 3

Chamber C1 in FIG. 4 is filled with liquid, and vents V1 and V2 are both closed.

In this Example, the engine weight is supported by gas pressure in chamber C2 (via the liquid in chamber C1). Axial resilience is provided mainly by the pressurised gas in chamber C2.

EXAMPLE 4

In this version of the design shown in FIG. 4, the resilient member R2 is formed as a rubber spring, i.e. having a substantial cross-section to provide the required axial stiffness, and the resilient member R1 is formed as a diaphragm. Chamber C1 is filled with liquid and chamber C2 is freely vented to atmosphere through vent V2. Vent V1 is closed.

In this Example, the resilient member R2 is arranged to support most of the engine weight through the liquid in chamber C1 and thus, as in the previous examples, isolates the actuator from the engine weight. In this Example the axial dynamic resilience is derived mainly from the resilience of the rubber resilient member (R2).

EXAMPLE 5

The arrangement described in Example 4 is modified by filling chamber C1 with pressurised gas instead of liquid.

The main difference in Example 5 as compared with Example 4 is that the axial dynamic resilience is obtained in Example 5 from the combined resilience (in series) of the pressurised gas in chamber C1 and the rubber resilient member R2.

EXAMPLE 6

In this version of FIG. 4 resilient member R1 is a rubber spring (having a thick cross-section) of substantial stiffness, and resilient member R2 is formed as a diaphragm. The chamber C1 is filled with gas or liquid and the chamber C2 is freely vented to atmosphere through vent V2. Vent V1 is closed.

In this arrangement the rubber spring (resilient member R1) supports most of the engine weight directly and isolates the actuator from the engine weight. The axial dynamic resilience is derived mainly from the resilience of the rubber member R1, which as in the previous Examples also provides the main radial dynamic resilience.

The application of the actuator force is via the gas or liquid in chamber C1.

EXAMPLE 7

The arrangement of Example 6 is modified by filling chamber C1 with air at atmospheric static pressure, vents V1 and V2 being open so that chamber C2 is freely vented to atmosphere, whilst chamber C1 may be dynamically pressurised because of the relatively restricted size of the vent which connects chambers C1 and C2.

As in Example 6 the resilient member R1 supports most of the engine weight directly and the main difference is that the application of the actuator force is via dynamically pressurised air in chamber C1.

EXAMPLE 8

Figure 5:
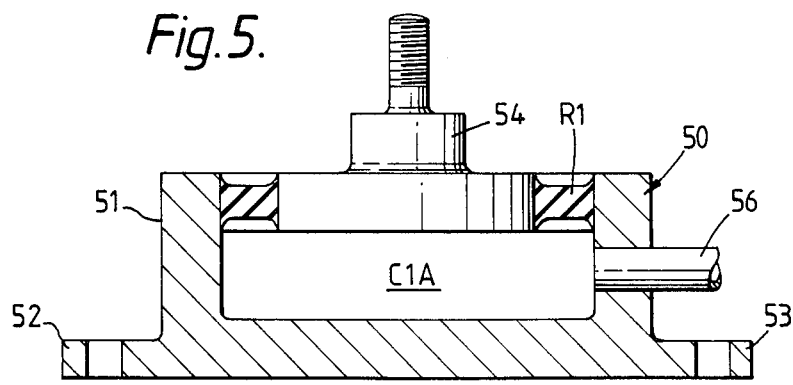
FIG. 5 is a similar view to FIG. 4, showing an alternative engine mount.
Figure 6:
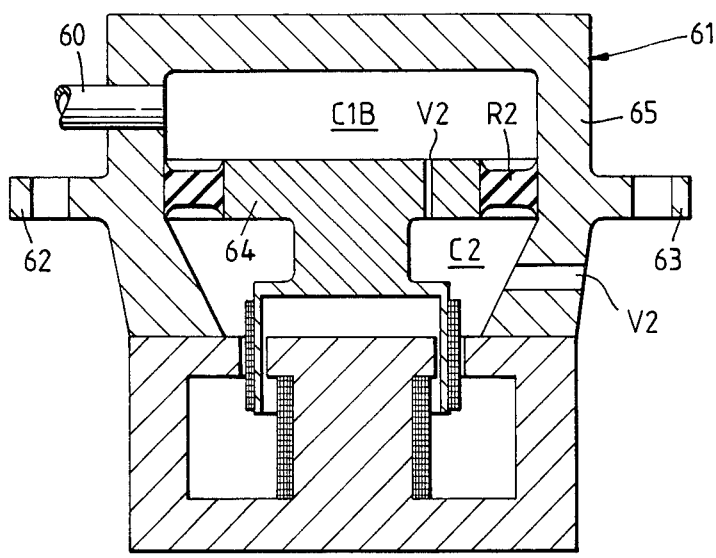
FIG. 6 is a similar view to that of FIG. 4, showing a remotely positioned actuator for the engine mount shown in FIG. 5.

FIGS. 5 and 6 illustrate an arrangement in which the engine mount and the actuator may be employed as separate units.

The engine mount 50 illustrated in FIG. 5 corresponds to the upper portion of the combined engine mount and power actuation means illustrated in FIG. 4. It comprises a casing 51 having lugs 52 and 53 by which it can be bolted to a body member to support the engine by means of an engine attachment member 54. The member 54 is positioned within the casing 51 by means of an annular resilient rubber member R1 as in FIG. 4 and an engine mount chamber C1A is formed in the casing as before to constitute part of a first chamber corresponding to that of the combined engine mount and actuator previously described. A pipe connection 56 is arranged to lead via a flexible tube to a pipe connection 60 of an associated independently mounted actuator 61 which is arranged to be secured to the vehicle body by lugs 62 and 63. The actuator 61 comprises an actuator member 64 suspended within a casing member 65 by means of an annular resilient member R2 as in the embodiment of FIG. 4 so that an actuator chamber C1B which provides in effect part of the volume of a first chamber C1 is formed as illustrated between the actuator member 64 and the casing 65. Thus the chamber C1A formed in the engine mount 50 and the volume of the connection pipe together with the chamber C1B of the actuator form a chamber equivalent to the first chamber C1 of FIG. 4.

The mode of function of the remotely actuated mount illustrated in FIGS. 5 and 6 is the same as that of the integral engine suspension mount and actuator shown in FIG. 4, and the Examples set out above to show versions of the general FIG. 4 construction are equally applicable to the inter-connected units of FIGS. 5 and 6.

All of Examples 1–7 described above are equally applicable to an arrangement in which one or more mounts as shown in FIG. 5 is or are connected by a pipe or pipes to a separate actuator assembly as shown in FIG. 6.

EXAMPLE 9

Figure 7:
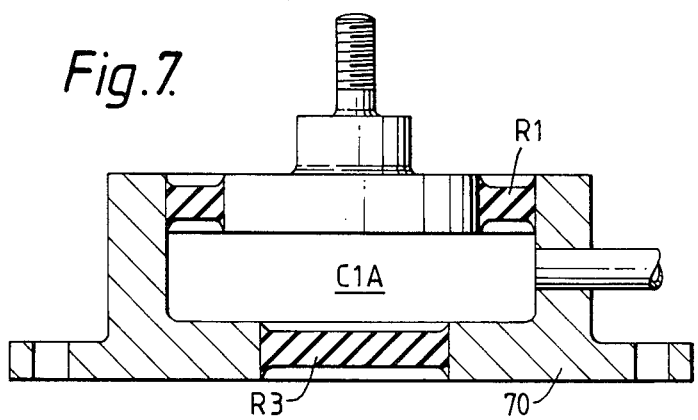
FIG. 7 is a similar view to that of FIG. 5 showing a modified engine mount.

FIG. 7 shows a modification of the engine mount shown in FIG. 5. In order to improve the isolation performance of the engine mount at higher frequencies (typically above 15 Hertz) it is necessary to increase the overall axial dynamic compliance of the system in order to overcome a problem which arises if the connecting pipe becomes choked at higher frequencies due to the viscosity and inertia of the fluid contained in it.

As shown in FIG. 7 additional dynamic axial compliance is provided by a "bulging" rubber spring disc R3 bonded into a circular aperture formed in the casing wall 70. All of the Examples described above are equally applicable to one or more engine mounts as shown in FIG. 7 connected by a pipe or pipes to one actuator assembly as shown in FIG. 6.

EXAMPLE 10

Figure 8:
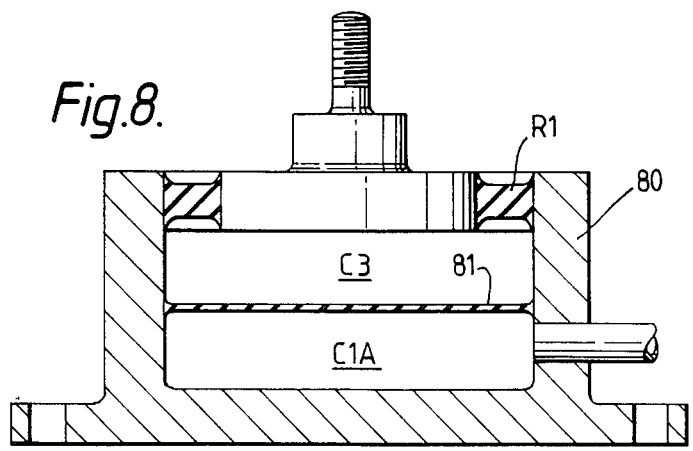
FIG. 8 is a similar view to that of FIG. 5 showing a further modified engine mount.

FIG. 8 shows a further modification of the engine mount of FIG. 5 in which a casing 80 is divided into two sub-chambers by a thin flexible and extensible membrane 81 secured fluid-tightly to the casing 80. In this arrangement if chamber C1 contains liquid, sub-chamber C3 is filled with gas the purpose of which is, as in the embodiment of FIG. 7, to provide axial resilience, particularly at high frequencies when the connecting pipe for the two parts of chamber C1 in the engine mount and the actuator respectively becomes choked.

The arrangement of FIG. 8 is also useful when sub-chamber C1A contains gas and is connected to an actuator chamber also containing gas: in this case sub-chamber C3 may be filled with a relatively incompressible fluid, i.e. a liquid, with the object of reducing the parasitic gas volume of sub-chamber C1A. An arrangement of this kind can be used in any suitable combination as described in the preceding Examples.

Figure 9:
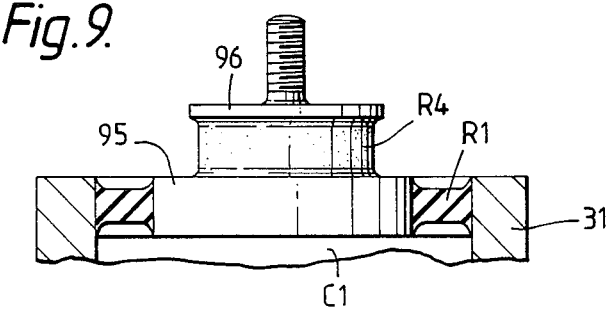
FIG. 9 is a similar view to that of FIG. 4 showing part of a further modified engine mount.

FIG. 9 shows a modification applicable to those examples where member R1 is a rubber spring (having thick cross-section) of substantial stiffness, in which it may be necessary to provide increased radial compliance, e.g. by the addition of a rubber compression spring R4 bonded to members 95 and 96, for the purpose of reducing noise transmission from the engine.

The spring R4 has relatively low stiffness in the radial (shear) direction and relatively high stiffness in the axial (compression) direction, this high axial stiffness being used to support the engine weight and to transmit axial forces applied to the spring R4 indirectly from the actuator via fluid in chamber C1 and the member 95 to the enginen via the member 96.

Figure 10:
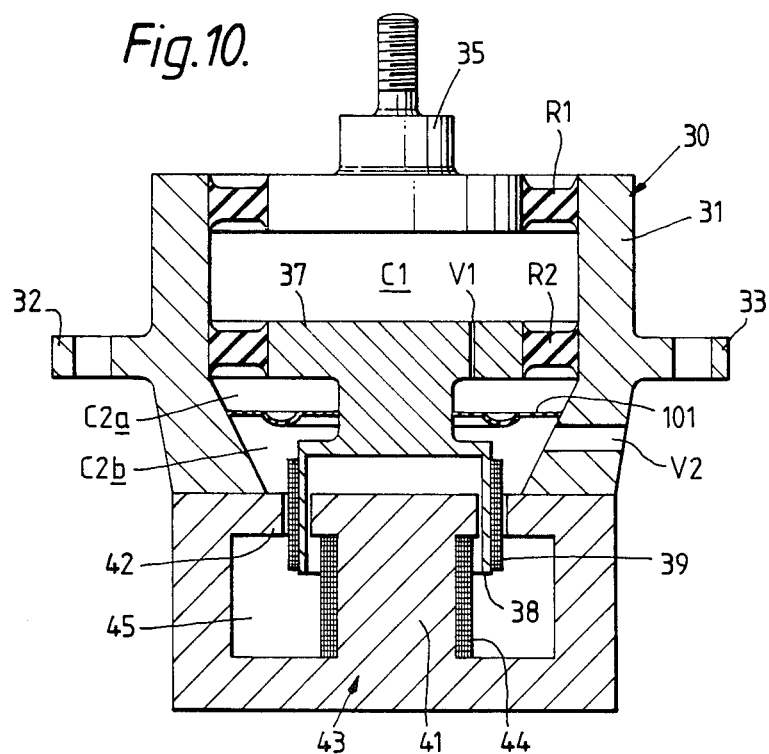
FIG. 10 is a similar view to that of FIG. 4 showing a further modification.

FIG. 10 shows a modification of the engine mount and power actuation means shown in FIG. 4. In the arrangement of FIG. 10, which is particularly suitable for the case where chamber C1 is liquidfilled, chamber C2 is divided into two chambers C2a and C2b by a thin flexible diaphragm 101 which is sealed at its outer periphery to the casing 31 and at its inner periphery to member 37 so as to isolate chamber C2a from chamber C2b, thus enabling a first sub-chamber C2a, communicating via vent V1 with chamber C1, to be filled with liquid and a second sub-chamber C2b to be vented to atmosphere through vent V2.

The modification of FIG. 10 has the advantage that the electromagnet 43 does not need to be immersed in liquid, and the venting of chamber C2b to atmosphere ensures that the static pressure in C1 and C2a is maintained at atmospheric pressure and the mean position of R2 remains in the undeformed state and is not affected by variation in engine weight or creep in R1. For this purpose the spring R1 may take the form of an annular cone-shaped rubber shear spring.

The engine suspension system in accordance with the invention has the advantage that it circumvents a fundamental problem in systems which couple the engine mounts to the body suspension system: this is that in order to meet the 'low noise' requirement low engine mount stiffness is required both in the axial and the radial senses. The introduction of coupling between the engine mount and a suspension strut tends to impose the requirement of a relatively stiff (at least in the axial sense) engine mount and this adversely affects the performacne of the system in reducing noise. By the adoption of a system in accordance with the invention the engine mount may be made with inherently low stiffness both in the axial and the radial senses whilst the power input from the electronic control unit can be employed actively to generate the required reaction thrusts in opposition to body movements without affecting the passive stiffness of the engine mounting system.

By the use of a suitable filter the accelerations of the body in the low or 'ride' frequency range (1–4 Hertz) are reduced as well as those in the 'shake' frequency range (8–16 Hertz).

The accelerometer may be mounted on the body without interfering with the main vehicle suspension, and the operation of the system is independent of the type of suspension provided. Thus installation of the system in accordance with the invention requires relatively few changes to the standard vehicle design.

We claim:

1. A vehicle engine suspension system comprising engine suspension means arranged to be mounted on operative relation to a body and an engine of a vehicle and power actuation means for said engine suspension means arranged to be actuated by energy from a source external to the said engine suspension and power actuation means, detector means for sensing movements of the body or forces applied thereto, and control means for the power actuation means, said cotrol means being responsive to the detector means to govern the supply of energy from said source to the power actuation means whereby movement of the body or a tendency of the body to move causes operation of the power actuation means so as to tend to move the engine and thereby create a reaction force via the engine suspension means on the body tending to reduce the said movement or tendency to move on the body.

2. A vehicle engine suspension system according to claim 1 for application to a motor car wherein the detector means is arranged to be positioned to detect vertical movement or acceleration of the body in a generally vertical direction and the system is arranged to generate opposing vertical reaction forces on the body.

3. A vehicle engine suspension system according to claim 1 wherein the power actuation means is electrically actuated.

4. A vehicle engine suspension system according to claim 1 wherein the detector means comprises an accelerometer attached to the vehicle body in a position to detect vertical accelerations of the body.

5. A vehicle engine suspension system according to claim 1 comprising at least one engine mount wherein the control means comprises an electronic control unit arranged to control the supply of electrical power to actuation means contained in or in association with said engine mount.

6. A vehicle engine suspension system according to claim 5 wherein said control means comprises a high pass second order filter.

7. A vehicle engine suspension according to claim 1 wherein the power actuation means is integral with the engine mount.

8. A vehicle engine suspension system according to claim 1 wherein the power actuation means is separate from the engine mount associated therewith.

9. A vehicle engine suspension system according to claim 7 wherein a combined engine mount and power actuation means comprises an outer casing, an attachment member suspended in relation to the casing by means of a first annular flexible member so as to enclose a first chamber, an actuator member suspended within said casing by means of a second annular flexible member so as to close one side of said first chamber, electrical actuation means being provided for the actuator member, whereby the attachment member and the casing member are arranged to be secured one to the engine and one to the vehicle body and whereby the weight of the engine is capable of being supported at least in part by the pressure of fluid in said first chamber and wherein the electrical actuation means is capable of applying thrusts to said actuation member to move said actuation member and thereby transmit corresponding thrusts via the fluid pressure in the first chamber to the attachment member.

10. A vehicle engine suspension system according to claim 9 wherein a second chamber is formed between the second flexible member and the casing and sealed from the first chamber by the second flexible member, and wherein a vent is provided to connect the first and second chambers and both chambers contain gas under pressure.

11. A vehicle engine suspension system according to claim 9 wherein a second chamber is formed between the second flexible member and the casing and sealed from the first chamber by the second flexible member, wherein the first and second chambers each contain pressurised gas and the pressure of gas in the first chamber is different from that in the second chamber.

12. A vehicle engine suspension system according to claim 9 wherein a second chamber is formed between the second flexible member and the casing and sealed from the first chamber by the second flexible member, wherein the first chamber is filled with a liquid and the second chamber contains pressurised gas.

13. A vehicle engine suspension system according to claim 9 wherein the first chamber is filled with a liquid, the second flexible member constitutes a spring, and a second chamber formed between the second flexible member and the casing is vented to atmosphere.

14. A vehicle engine suspension system according to claim 13 modified so that the said first chamber contains pressurised gas instead of liquid.

15. A vehicle engine suspension system according to claim 9 wherein the first flexible member constitutes a spring, the first chamber is filled with a liquid or gas, and a second chamber formed between the second flexible member and the casing is vented to atmosphere.

16. A vehicle engine suspension system according to claim 15 wherein the first chamber contains air at atmospheric static pressure, the second chamber is vented to atmosphere, and a vent of restricted size connects the first and second chambers.

17. A vehicle engine suspension system according to claim 9 with the modification that the engine mount and the power actuation means are separate, the volume of said first chamber effectively being provided by an engine mount chamber, a connecting pipe, and an actuator chamber in the actuation means.

18. A vehicle engine suspension system according to claim 17 wherein a rubber spring disc is provided in the wall of the engine mount chamber to provide additional dynamic axial compliance.

19. A vehicle engine suspension system according to claim 17 wherein the engine mount chamber is divided into two sub-chambers by a thin flexible and extensible members, one sub-chamber adjacent the engine attachment member containing gas and the other sub-chamber containing liquid and being connected to the actuator chamber.

20. A vehicle suspension system according to claim 17 wherein the engine mount chamber is divided into two sub-chambers by a thin flexible and extensible membrane, one sub-chamber adjacent the engine attachment member containing liquid and the other sub-chamber containing gas and being connected to an actuator chamber also containing gas.

21. A vehicle engine suspension system according to claim 9 wherein the electrical actuation means comprises a coil secured to and coaxial with the actuator member, an electromagnet having a central pole piece, an outer annular pole piece, and an energising coil around the central pole piece, the coil being mounted for axial movement relative to the electromagnet.

22. A vehicle engine suspension system according to claim 9 wherein a second chamber is formed between the second flexible member and the casing and sealed from the first chamber by the second flexible member, and wherein a thin flexible diaphragm is provided to divide the second chamber into two sub-chambers, a vent of restricted size being provided to connect the first chamber to a first sub-chamber of the second chamber, and the second sub-chamber of the second chamber being vented to atmosphere.

23. A vehicle comprising an engine supported by a vehicle engine suspension system according to claim 1.

* * * * *